US011671984B2

(12) United States Patent
Park

(10) Patent No.: US 11,671,984 B2
(45) Date of Patent: Jun. 6, 2023

(54) METHOD AND APPARATUS FOR CONTROLLING SEARCH SPACE FOR POWER SAVING

(71) Applicant: KT CORPORATION, Gyeonggi-do (KR)

(72) Inventor: Ki-Hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 22 days.

(21) Appl. No.: 17/352,233

(22) Filed: Jun. 18, 2021

(65) Prior Publication Data

US 2021/0400645 A1 Dec. 23, 2021

(30) Foreign Application Priority Data

Jun. 19, 2020 (KR) .................. 10-2020-0075069
May 26, 2021 (KR) .................. 10-2021-0067677

(51) Int. Cl.
*H04W 24/08* (2009.01)
*H04W 72/23* (2023.01)
*H04W 64/00* (2009.01)
*H04W 72/54* (2023.01)

(52) U.S. Cl.
CPC ......... *H04W 72/23* (2023.01); *H04W 64/003* (2013.01); *H04W 72/54* (2023.01)

(58) Field of Classification Search
CPC ........... H04W 72/042; H04W 72/0446; H04W 72/048; H04W 72/1263; H04W 24/08; H04W 72/044; H04W 52/0216; H04W 52/0232; H04W 48/12; H04W 76/28; H04W 80/02; H04L 5/0053; H04L 5/0092; H04L 5/1469; Y02D 30/70
See application file for complete search history.

(56) References Cited

U.S. PATENT DOCUMENTS

| | | | |
|---|---|---|---|
| 11,323,236 B2* | 5/2022 | Xu | H04W 4/70 |
| 11,330,575 B2* | 5/2022 | Lin | H04L 1/0075 |
| 11,337,093 B2* | 5/2022 | Seo | H04B 7/0695 |
| 11,395,283 B2* | 7/2022 | Lin | H04W 48/16 |
| 11,425,707 B2* | 8/2022 | Papasakellariou | H04L 5/0053 |
| 2020/0229008 A1* | 7/2020 | Islam | H04L 1/0026 |
| 2022/0061033 A1* | 2/2022 | Lin | H04W 52/0216 |
| 2022/0132341 A1* | 4/2022 | Lee | H04W 72/042 |
| 2022/0150835 A1* | 5/2022 | Lin | H04W 52/0229 |
| 2022/0190989 A1* | 6/2022 | Tiirola | H04L 5/0094 |
| 2022/0191793 A1* | 6/2022 | Murray | H04W 72/044 |
| 2022/0191867 A1* | 6/2022 | Papasakellariou | H04W 72/0413 |
| 2022/0217723 A1* | 7/2022 | Papasakellariou | H04L 5/0094 |
| 2022/0217736 A1* | 7/2022 | Taherzadeh Boroujeni | H04W 72/0446 |
| 2022/0232536 A1* | 7/2022 | Lin | H04W 52/0241 |
| 2022/0240284 A1* | 7/2022 | Zhou | H04W 52/0225 |
| 2022/0272556 A1* | 8/2022 | Seo | H04W 72/10 |

* cited by examiner

*Primary Examiner* — Jung Liu
(74) *Attorney, Agent, or Firm* — IP Legal Services, LLC

(57) ABSTRACT

Provided are a method and an apparatus for controlling a search space. The method may include receiving configuration information for at least one search space, receiving indication information on at least one of time duration information and search space information for not monitoring a downlink control channel for the at least one search space, and monitoring the downlink control channel based on the indication information.

15 Claims, 13 Drawing Sheets

METHOD AND APPARATUS FOR CONTROLLING SEARCH SPACE FOR POWER SAVING

CROSS REFERENCE TO RELATED APPLICATION

This application claims priority from Korean Patent Application No. 10-2020-0075069 filed on Jun. 19, 2020 and Korean Patent Application No. 10-2021-0067677 filed on May 26, 2021, both of which are hereby incorporated by reference for all purposes as if fully set forth herein.

BACKGROUND

Field

Embodiments are related to a method and apparatus for configuring and operating a search space of a downlink control message for a low-power UE in a next-generation radio access network (hereinafter, referred to as "new radio or NR").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, sub-frame, Transmission Time Interval (TTI), etc.) as a method for efficiently satisfying each usage scenario requirement through a frequency band constituting any NR system.

In consideration of this aspect, it is necessary for design for configuring and operating a search space of a downlink control message for a low-power UE in the NR environment.

BRIEF SUMMARY

Embodiments of the present disclosure provide a method and apparatus for controlling a search space for a low-power UE in the NR environment.

According to one aspect, the embodiments provide a method for a user equipment (UE) for controlling a search space. The method may include receiving configuration information for at least one search space, receiving indication information on at least one of time duration information and search space information for not monitoring a downlink control channel for the at least one search space, and monitoring the downlink control channel based on the indication information.

According to another aspect, the embodiments provide a method for a base for controlling a search space. The method may include transmitting configuration information for at least one search space to a user equipment (UE), and transmitting indication information on at least one of time duration information and search space information for not monitoring a downlink control channel for the at least one search space to the UE.

According to still another aspect, the embodiments provide a user equipment (UE) for controlling a search space. The UE may include a receiver configured to receive configuration information for at least one search space, and receive indication information on at least one of time duration information and search space information for not monitoring a downlink control channel for the at least one search space, and a controller configured to monitor the downlink control channel based on the indication information.

According to still another aspect, the embodiments provide a base for controlling a search space. The base station may include a transmitter configured to transmit configuration information for at least one search space, and transmit indication information on at least one of time duration information and search space information for not monitoring a downlink control channel for the at least one search space, and a controller configured to control an operation of the transmitter.

According to the disclosed embodiments, it is possible to provide a method and apparatus capable of reducing power required for the low-power UE to transmit and receive a downlink control message by controlling the search space for the low-power UE in the NR environment.

DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
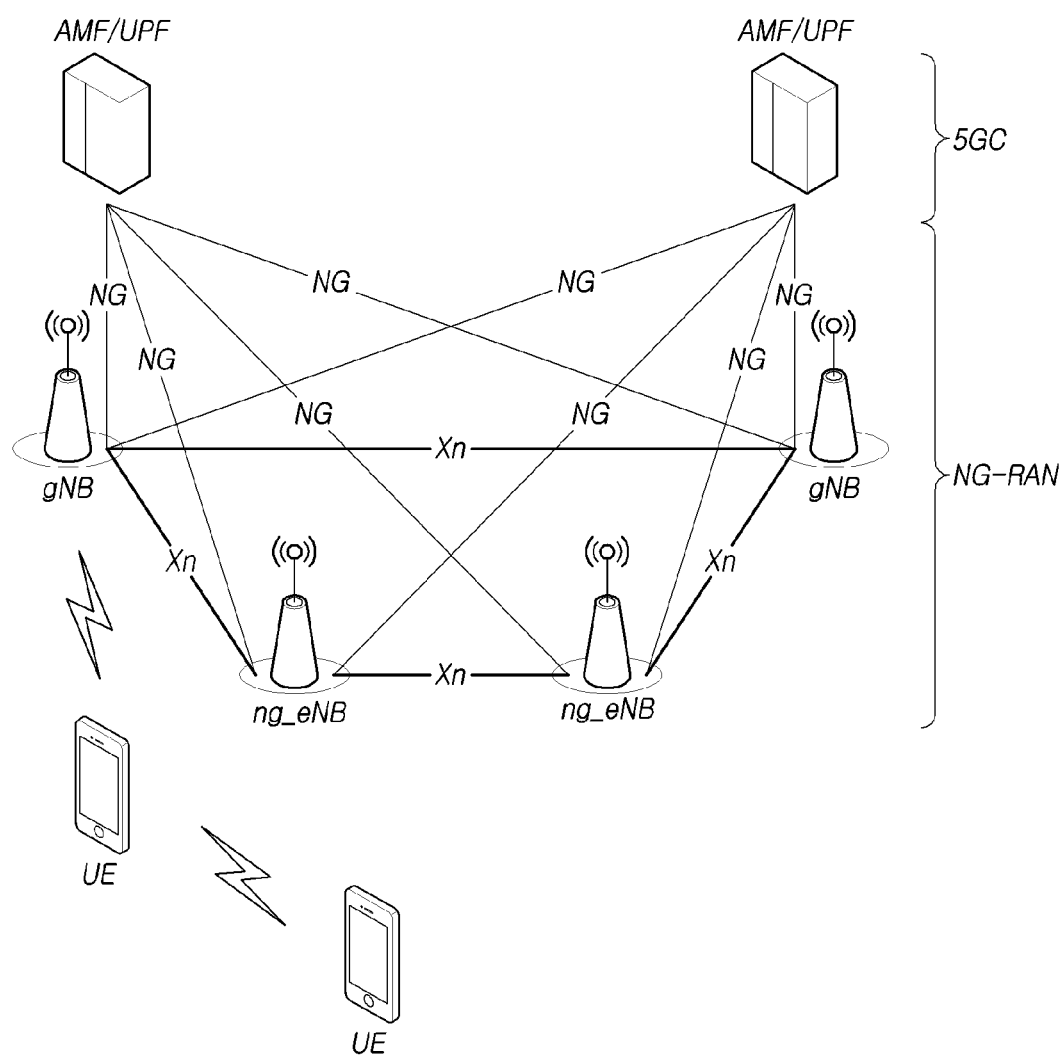
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1(FR1)) and frequency bands equal to or greater than 6 GHz (frequency range 2(FR2)).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT)-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
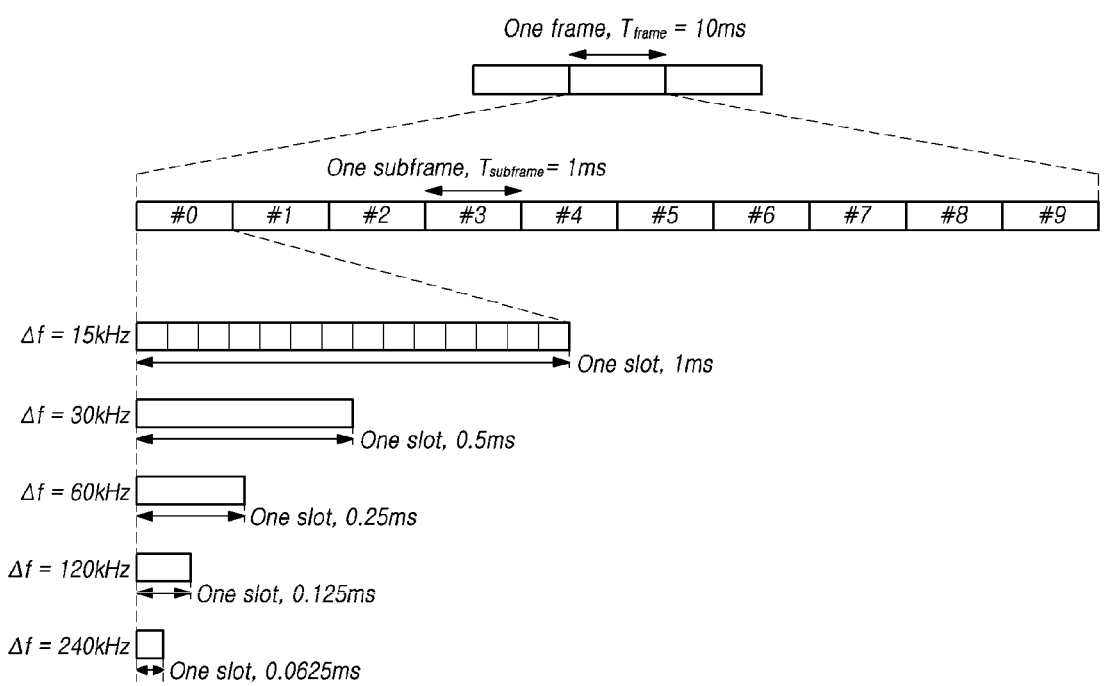
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR frame structure, a frame is defined to include 10 sub-frames each having the same length of 1 ms and has a length of 10 ms. One frame may be divided into half frames of 5 ms, and each half frame includes 5 sub-frames. In the case of a subcarrier spacing of 15 kHz, one sub-frame includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the sub-frame. On the other hand, in the case of a numerology having a subcarrier spacing of 30 kHz, the slot includes 14 OFDM symbols, but one sub-frame may include two slots each having a length of 0.5 ms. That is, the sub-frame and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
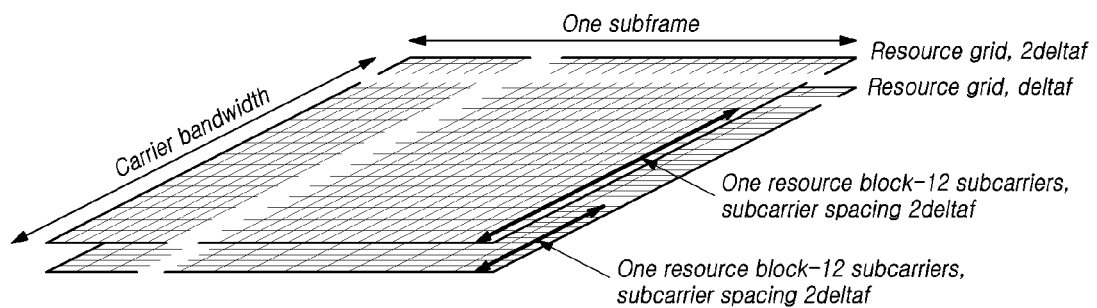
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
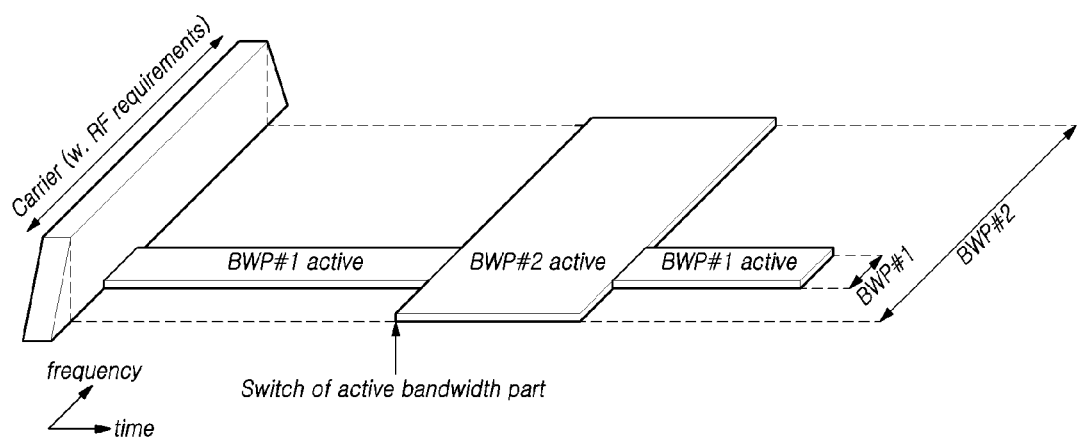
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR.

Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
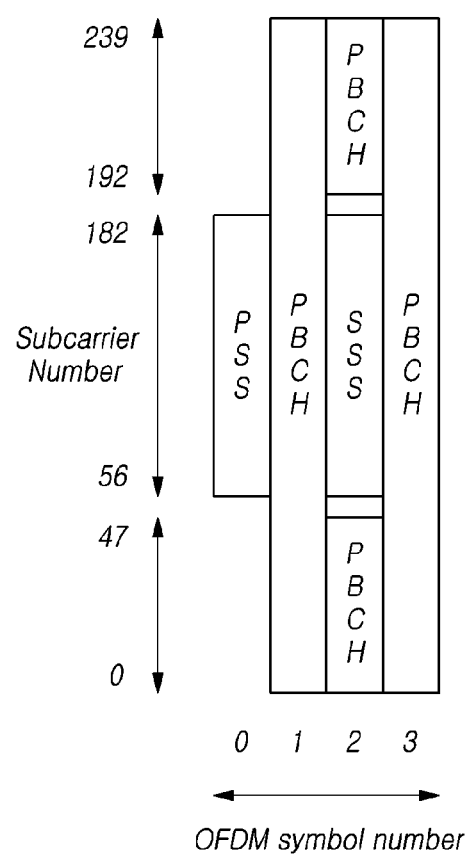
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
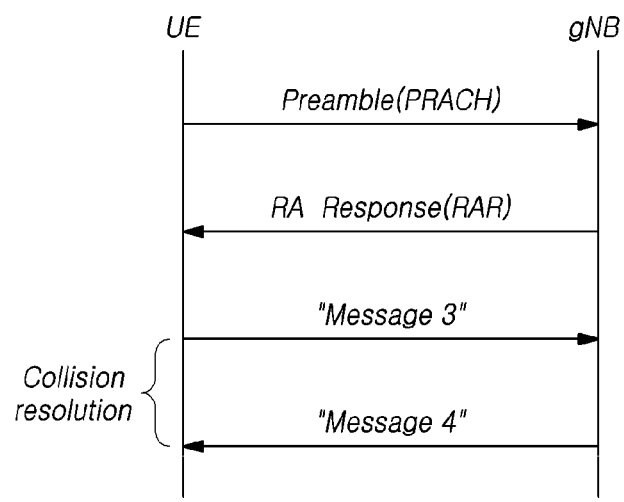
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
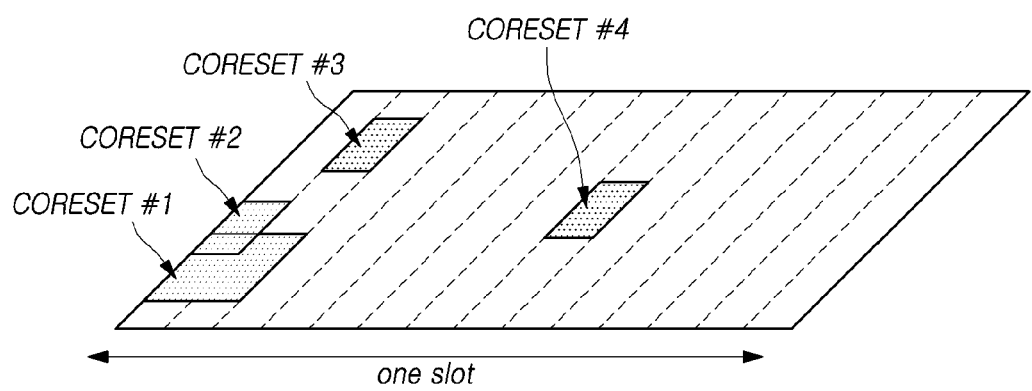
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

<NR sidelink>

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
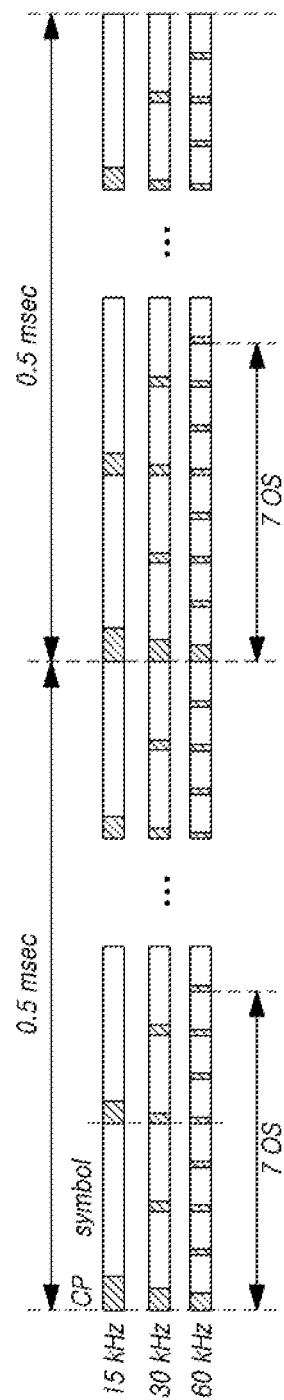
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
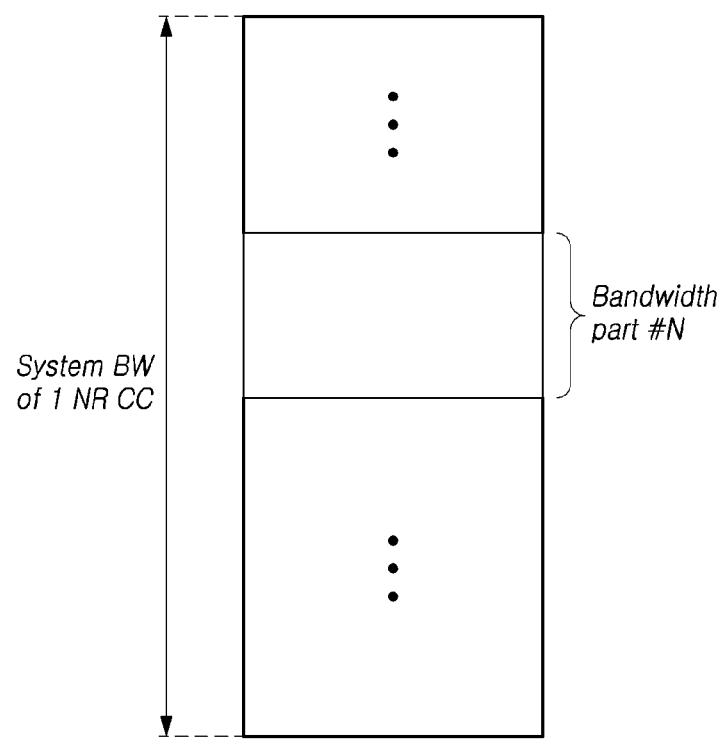
FIG. 9 is a view schematically illustrating a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

In the NR, for transmission of a downlink control message (e.g., a downlink control information (DCI)), a downlink control message is classified for each purpose, and a search space for transmitting a specific control message to be received by the user is configured for each user. Thereafter, if necessary, a method of transmitting the downlink control message through the pre-configured corresponding search space is used. At this time, the search space divided into a common search space (hereafter referred to as CSS) and a UE-specific search space (hereafter referred to as USS). The CSS is configured to the corresponding base station, to be precise, to all users within the corresponding BWP and is simultaneously searched by them. The USS is configured only to a specific user and is searched only by that user. The CSS is divided into four types as follows.

- Type 0: It is configured through pdcch-ConfigSIB1 in the MIB. It is a space for transmitting a control message for transmitting SIB1 (System Information Block 1). The SIB1 is used to transmit the remaining minimum system information (RMSI). The control message transmitted through the corresponding space is scrambled through the SI-RNTI.
- Type-0A: It is configured through pdcch-ConfigCommon in the SIB1, and it is a space for transmitting a control message for transmitting OSI (Other System Information). The control message transmitted through the corresponding space is also scrambled through the SI-RNTI.
- Type-1: Similarly, it is configured through pdcch-ConfigCommon in the SIB1, and it is a space for transmitting a control message for transmitting the RACH response in response to the user's random access preamble. The control message transmitted through the corresponding space is scrambled through the RA-RNTI and, in the case of the unlicensed band, the TC-RNTI.
- Type-2: It is configured through pdcch-ConfigCommon, and it is the space where the paging control message to be received by the user entering the idle/inactive state is transmitted. The control message transmitted through the corresponding space is scrambled through the P-RNTI.
- Type-3: It is configured through pdcch-Config. At this time, if the search space type is commonly designated, it becomes Type-3 CSS. In general, it is a space where group common control messages such as slot format indication (SFI), pre-emption presence (interruption) indication (INT), group transmission power control (TPC), cancellation indication (CI), power saving (PS), etc. are transmitted. PDCCH 0_0/1_0 may also be transmitted to this space. Each control message is identified by an RNTI, and each control message is scrambled to SFI-/INT-/TPC-x-/CI-/PS- and C-/CS-/MCS-C-RNTI, respectively.

At this time, the USS may be configured according to each user's situation, but in the case of the CSS, it is generally configured at the same location within the same BWP, because it is a space for transmitting control messages that all users need to use.

In such a typical system, there was no difficulties in using the CSS because it assumes the same performance for each user. However, if the low-power supporting UE is introduced, the same CSS is configured as that of an existing user. Such configuration causes frequent attempts to detect the CSS due to the characteristic that the corresponding space must be detected. Such characteristic causes a power problem.

Accordingly, the present disclosure provides a method for enabling the low-power UE to perform a control message detection attempt with less frequency in the NR system. In particular, to this end, the present disclosure provides a method for indicating and operating the CSS for the low-power UE and a method for skipping a control message detection attempt through the downlink control message for a pre-determined time.

Hereinafter, a method of configuring and operating a search space of a downlink control message for the low-power UE will be described with reference to related drawings.

Figure 10:
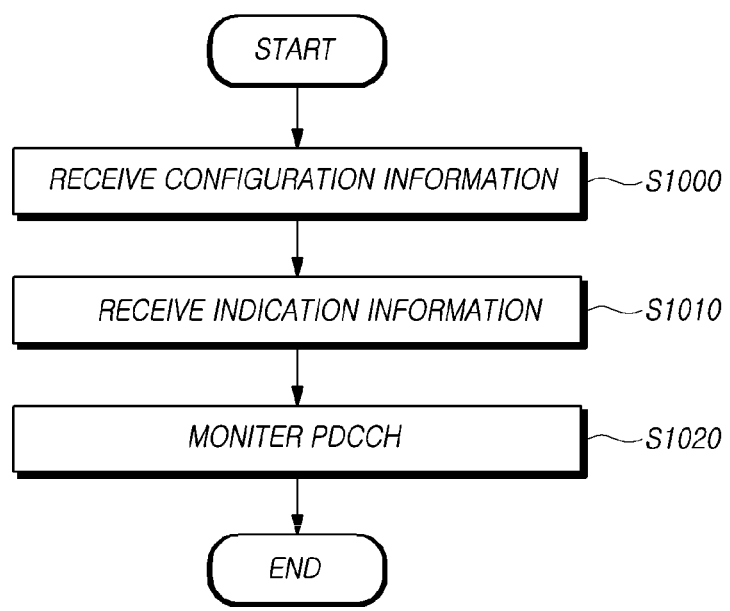
FIG. 10 is a flowchart of a method of a user equipment for controlling a search space for power saving according to an embodiment.

FIG. 10 is a flowchart of a method of a user equipment for controlling a search space for power saving according to an embodiment.

Referring to FIG. 10, a user equipment (UE) for controlling a search space for power saving according to an embodiment may receive configuration information for at least one search space at S1000.

The UE may receive, from the base station, the configuration information for the search space for receiving downlink control information (DCI) transmitted from the base station to the UE. The search space includes control channel candidates that may exist in the control channel element at a specific aggregation level, and a plurality of search spaces may be configured for one UE.

According to an embodiment, the configuration information for the search space may include configuration information for a search space set group including at least one search space. In this case, the search space set group may include two search space set groups for each of at least one bandwidth part configured for the UE. Also, the group ID of the configured search space set group may be configured to 0 or 1.

Referring back to FIG. 10, the UE may receive indication information for at least one of time duration information and search space information for not monitoring a downlink control channel (PDCCH) for at least one search space at S1010.

The indication information may be configured for the at least one search space configured in a bandwidth part activated for the UE when the UE is activated. That is, the corresponding indication information may indicate whether to monitor the search spaces configured in the currently active bandwidth part on the premise that the UE itself is in an active state.

According to an embodiment, the indication information may include the time duration information for not monitoring the PDCCH. The time duration information may include at least one of a duration and a periodic interval for not monitoring the PDCCH. Such indication information is indicated through the DCI. For example, such indication information may be indicated by a predetermined field value in the DCI. In order words, the DCI may dynamically indicate a duration and periodic interval for skipping monitoring the PDCCH.

When such indication information is received through the DCI, the UE may not perform monitoring for the PDCCH for the indicated duration from the time of receiving the corresponding indication information. Alternatively, the UE may not periodically perform monitoring for the PDCCH during the interval according to the indicated periodic interval.

According to another embodiment, the indication information may include group ID information for a search space set group including a search space for not monitoring the PDCCH among the at least one search space. Such indication information is indicated through the DCI. For example, such indication information may be indicated by a predetermined field value in the DCI.

For example, the indication information may indicate switching of the search space set group to be monitored or not to be monitored according to the search space set group switching field value in DCI format 2_0. That is, as described above, it is assumed that the group ID of the two search space set groups is configured to 0 or 1 for the UE. In this case, when the value of the search space set group switching field is 0, the UE may monitor the search space set group having the group ID of 0 and stop monitoring the search space set group having the group ID of 1.

In this case, as an example, a delay value may be configured for switching of the search space set group based on the capability of the UE. The delay value required for switching of the search space set group may be configured differently according to the processing capability of the UE and the value of the subcarrier spacing applied to the corresponding bandwidth part. For example, the delay value may be configured to the number of symbols. That is, the delay value may be configured greater as the value of subcarrier spacing becomes greater, or the delay value may be configured greater as the processing capability of the UE becomes lower. The corresponding delay value may be indicated to the UE through higher layer signaling such as a RRC message, and the UE may further reflect the indicated delay value to determine whether to switch to the search space set group to be monitored.

Referring back to FIG. 10, the UE may monitor the PDCCH based on the received indication information at S1020.

Based on the received indication information, the UE may attempt blind decoding in a time duration other than the time duration in which monitoring is not performed or a search space other than the search space in which monitoring is not performed. Therefore, regardless of whether the base station transmits the PDCCH, it is possible to save power by not trying to monitor for a predetermined time duration or search space.

The method of the UE according to an embodiment may reduce power required for the low-power UE to transmit and receive the downlink control message in the NR system.

Figure 11:
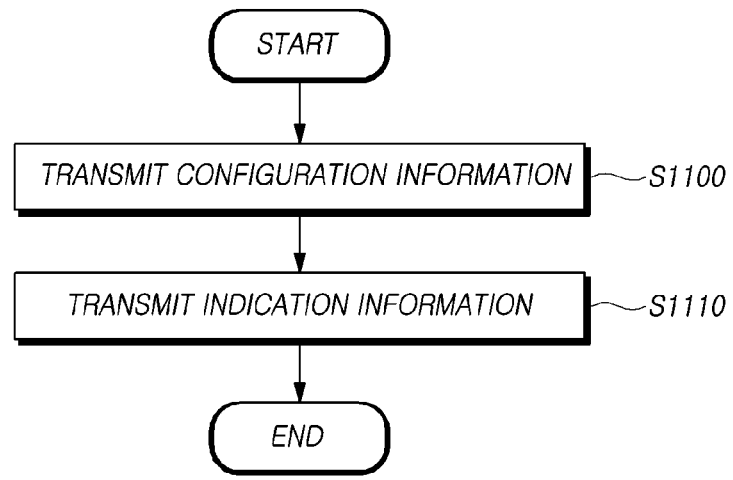
FIG. 11 is a flowchart of a method of a base station controlling a search space according to an embodiment.

FIG. 11 is a flowchart of a method of a base station for performing a random access procedure for coverage enhancement according to an embodiment.

Referring to FIG. 11, the base station may transmit configuration information for at least one search space at S1100.

The base station may transmit the configuration information for a search space for transmitting downlink control information (DCI) to the UE. The search space includes control channel candidates that may exist in the control channel element at a specific aggregation level, and a plurality of search spaces may be configured for one UE.

According to an embodiment, the configuration information for the search space may include configuration information for a search space set group including at least one search space. In this case, the search space set group may include two search space set groups for each of at least one bandwidth part configured for the UE. Also, the group ID of the configured search space set group may be configured to 0 or 1.

Referring back to FIG. 11, the base station may transmit indication information for at least one of time duration information and search space information for not monitoring a downlink control channel (PDCCH) for at least one search space at S1110.

The indication information may be configured for the at least one search space configured in a bandwidth part activated for the UE when the UE is activated (e.g., when the UE is in a state of activation). That is, the corresponding indication information may indicate whether to monitor the search spaces configured in the currently active bandwidth part on the premise that the UE itself is in an active state.

According to an embodiment, the indication information may include the time duration information for not monitoring the PDCCH. The time duration information may include at least one of a duration and a periodic interval for not monitoring the PDCCH. Such indication information is indicated through the DCI. For example, such indication information may be indicated by a predetermined field value in the DCI. In order words, the DCI may dynamically indicate a duration and periodic interval for skipping monitoring the PDCCH.

When such indication information is received through the DCI, the UE may not perform monitoring for the PDCCH for the indicated duration from the time of receiving the corresponding indication information. Alternatively, the UE may not periodically perform monitoring for the PDCCH during the interval according to the indicated periodic interval.

According to another embodiment, the indication information may include group ID information for a search space set group including a search space for not monitoring the PDCCH among the at least one search space. Such indication information is indicated through the DCI. For example, such indication information may be indicated by a predetermined field value in the DCI.

For example, the indication information may indicate switching of the search space set group to be monitored or not to be monitored according to the search space set group switching field value in DCI format 2_0. That is, as described above, it is assumed that the group ID of the two search space set groups is configured to 0 or 1 for the UE. In this case, when the value of the search space set group switching field is 0, the UE may monitor the search space set group having the group ID of 0 and stop monitoring the search space set group having the group ID of 1.

In this case, as an example, a delay value may be configured for switching of the search space set group based on the capability of the UE. The delay value required for switching of the search space set group may be configured differently according to the processing capability of the UE and the value of the subcarrier spacing applied to the corresponding bandwidth part. For example, the delay value may be configured to the number of symbols. The delay value may be configured greater as the value of subcarrier spacing becomes greater, or the delay value may be configured greater as the processing capability of the UE becomes lower. The corresponding delay value may be indicated to the UE through a higher layer signaling such as a RRC message, and the UE may further reflect the indicated delay value to determine whether to switch to the search space set group to be monitored.

Based on the received indication information, the UE may attempt blind decoding in a time duration other than the time duration in which monitoring is not performed or a search space other than the search space in which monitoring is not performed. Therefore, regardless of whether the base station transmits the PDCCH, it is possible to save power by not trying to monitor for a predetermined time duration or search space.

The method of the base station according to an embodiment may reduce power required for the low-power UE to transmit and receive the downlink control message in the NR system.

Hereinafter, each embodiment related to a method of controlling a search space in the NR system will be described in detail with reference to related drawings. The embodiments described below may be applied individually or in any combination.

The present disclosure provides a method for enabling a low-power UE to perform a control message detection attempt with less frequency in NR. In particular, to this end, the present disclosure provides a method for indicating and operating a common search space for a low-power UE and a method for skipping a control message detection attempt through a downlink control message for a predetermined time.

The present disclosure may provide (1) a method for indicating and operating a common search space for a low-power UE, (2) a method of indicating a search space skip through DCI, and (3) a method of indicating a search space skip through a higher layer signal.

Embodiment 1. Method for Indicating and Operating a Common Search Space for a Low-Power UE This embodiment 1 is a method of additionally delivering the configuration information related to the search space to the low-power UE on the assumption that the low-power UE can transmit information to be received through only a part of the common search space. Specifically, this embodiment 1 may be divided into a method of configuring an additional duration for the low-power UE and a method of re-configuring time/frequency resources.

① Method of Additionally Configuring a Duration for a Low-Power UE

This method additionally configures a duration for the low-power UE different from the previously configured search space duration. According to an embodiment, the duration may be differently configured by reconfiguring the absolute duration value of the search space duration. Alternatively, the duration may be differently configured as a multiple of a previously configured duration or as a value obtained by subtracting 1 from the previously configured duration. In the latter case, the obtained value may be an integer indicating how many search spaces the corresponding UE skips within the duration. In addition, the location of the valid search space may be expressed in the form of a bitmap defined within a predetermined duration, and the bitmap may be transmitted to each user When the corresponding information is configured, the low-power UE may perform control message detection only for a valid space configured to itself in the common search space.

② Method of Separately Configuring the Resource Area of the Search Space for the Low-Power UE This method separately configures a location on a search space to be searched for by the low-power UE preferentially. The low-power UE may perform a first detection attempt in the corresponding search space, and the low-power UE may not perform a detection attempt in the remaining search space.

For example, the low-power UE may always present in the previous symbol in time, but in the lower frequency in terms of frequency. Alternatively, a specific aggregation level (AL) may be selected so that the downlink control message is not transmitted at the corresponding aggregation level, or only a specific AL may be selected to transmit the downlink control message.

In this case, whether or not to attempt to detect the control message for a space that is not configured as a priority space may vary depending on whether the control message is detected in the priority detection area. In particular, by limiting the number of control messages, it is possible to prevent further detection in the same search space when a specific amount of control messages is detected.

Embodiment 2. Method of Indicating a Search Space Skip Through DCI

This embodiment 2 is a method of indicating not to perform detection in a specific search space for a predetermined time or a predetermined resource area through the downlink control information (DCI). Broadly, this method according to embodiment 2 may be divided into a method of collectively indicating the specific search space and a method of indicating a specific control message.

① Method to Skip the Specific Search Space for a Certain Duration of Time

This method indicates to skip detection of the control message in the specific search space for the predetermined time after receiving the control message for the predetermined time.

In this case, the search space may be pre-indicated in a standard manner such as, for example, a Type-3 common search space or by a higher layer signaling such as a RRC. Alternatively, the search space may be dynamically delivered as an ID for every DCI or as an index value of a pre-configured ID table. Alternatively, the valid/invalid region of the reconfigured common resource region in the embodiment 1 may be indicated.

② Method to Skip the Reception of the Specific Control Message for a Certain Duration of Time This method assumes that the specific control message is not transmitted for a certain duration of time. As a result, this method reduces the detection complexity by excluding the number of scrambling cases of the control message. For example, since information such as the slot format indication or group transmission power control is not transmitted frequently, it can be skipped for a certain time through the corresponding control message. As an example, DCI format 1_0/0_0 is not used for a certain duration of time and DCI format 1_1/0_1 is used only for that duration of time or vice versa.

Through this, the UE may be able to determine the RNTI scrambling that it will not attempt to detect, thereby reducing the detection complexity as a result. In addition, when the specific search space is used for transmits only the control message that the UE is skipping or does not need to receive, an attempt to detect the entire corresponding space may not be indirectly performed.

Embodiment 3. Method of Indicating a Search Space Skip Through a Higher Layer Signal This embodiment 3 is a method of indicating not to perform detection in the specific search space for a certain time or a certain resource area through a higher layer control signal such as a RRC. As described above in the embodiment 2, it may be broadly divided into a method for collectively indicating the specific search space and a method for indicating the specific control message.

① Method to Skip the Specific Search Space for a Certain Duration of Time

The method instructs the control message to skip detection of a control message in a specific search space for a predetermined time after reception during a frame or slot indicated by a higher layer control signal.

② Method to Skip the Reception of the Specific Control Message for a Certain Duration of Time This method reduces detection complexity by assuming that the specific control message is not transmitted for a predetermined time indicated by a higher layer control signal, as in the embodiment 2.

The methods provided in the present disclosure may be applied independently, or may be operated in combination in any form. In addition, in the case of a new term, an arbitrary name that is easy to understand the meaning of the term used in the present disclosure is used, and the invention of the present disclosure can be applied even when other terms having the same meaning are actually used.

According to the embodiments above, the power required for the low-power UE to transmit and receive the downlink control message in the NR system may be reduced.

Hereinafter, detailed description will be made with respect to the hardware and software structure of the UE and the base station being capable of implementing some or all of the embodiments as described with reference to FIGS. 1 to 11.

Figure 12:
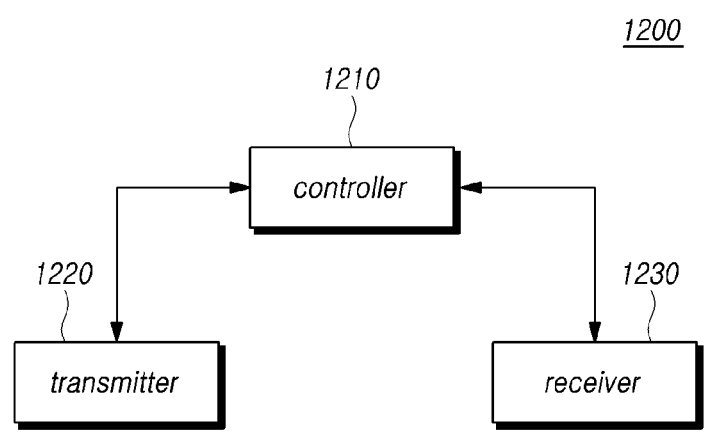
FIG. 12 is a view showing a user equipment according to an embodiment.

FIG. 12 is a block diagram showing a UE 1200 according to an embodiment.

Referring now to FIG. 12, the UE 1200 according to the embodiment may include a controller 1210, a transmitter 1220, and a receiver 1230.

The controller 1210 may be a set of at least one processors and control the overall operation of the UE 1200 to perform the method for controlling a search space by the UE according to the embodiments. The transmitter 1220 may be a circuitry communicating to the other constituent elements including the receiver 1230 and the controller and controlled by the controller 1210. The transmitter 1220 may transmit uplink control information, data, and messages to a base station through a corresponding channel, and transmit sidelink control information, data, and messages to other UE through a corresponding channel. The receiver 1230 may be a circuitry that communicates to the other constituent elements including the transmitter 1220 and the controller 1210 and controlled by the controller 1210. The receiver 1230 may receive downlink control information, data, and messages from the base station through a corresponding channel, and receive sidelink control information, data, and messages from other UE through a corresponding channel.

The receiver 1230 may receive configuration information for at least one search space. The receiver 1230 may receive, from the base station, the configuration information for the search space for receiving downlink control information (DCI) transmitted from the base station to the UE. As mentioned above, the search space includes control channel candidates that may exist in the control channel element at a specific aggregation level, and a plurality of search spaces may be configured for one UE.

According to an embodiment, the configuration information for the search space may include configuration information for a search space set group including at least one search space. In this case, the search space set group may include two search space set groups for each of at least one bandwidth part configured for the UE. Also, the group ID of the configured search space set group may be configured to 0 or 1.

The receiver 1230 may receive indication information for at least one of time duration information and search space information for not monitoring a downlink control channel (PDCCH) for at least one search space. The indication information may be configured for the at least one search space configured in a bandwidth part activated for the UE when the UE is activated. That is, the corresponding indication information may indicate whether to monitor the search spaces configured in the currently active bandwidth part on the premise that the UE itself is in an active state.

According to an embodiment, the indication information may include the time duration information for not monitoring the PDCCH. The time duration information may include at least one of a duration and a periodic interval for not monitoring the PDCCH. Such indication information is indicated through the DCI. For example, such indication information may be indicated by a predetermined field value in the DCI. In order words, the DCI may dynamically indicate a duration and periodic interval for skipping monitoring the PDCCH.

When the receiver 1230 receives such indication information through the DCI, the controller 1210 may not perform monitoring for the PDCCH for the indicated duration from the time the corresponding indication information is received. Alternatively, the controller 1210 may not periodically perform monitoring for the PDCCH during the interval according to the indicated periodic interval.

According to another embodiment, the indication information may include group ID information for a search space set group including a search space for not monitoring the PDCCH among the at least one search space. Such indication information is indicated through the DCI. For example, such indication information may be indicated by a predetermined field value in the DCI.

For example, the indication information may indicate switching of the search space set group to be monitored or not to be monitored according to the search space set group switching field value in DCI format 2_0. That is, as described above, it is assumed that the group ID of the two search space set groups is configured to 0 or 1 for the UE. In this case, when the value of the search space set group switching field is 0, the controller 1210 may monitor the search space set group having the group ID of 0 and stop monitoring the search space set group having the group ID of 1.

In this case, as an example, a delay value may be configured for switching of the search space set group based on the capability of the UE. The delay value required for switching of the search space set group may be configured differently according to the processing capability of the UE and the value of the subcarrier spacing applied to the corresponding bandwidth part. For example, the delay value may be configured to the number of symbols. The delay value may be configured greater as the value of subcarrier spacing becomes, or the delay value may be configured greater as the processing capability of the UE becomes lower. The corresponding delay value may be indicated to the UE through higher layer signaling such as a RRC message, and the UE may further reflect the indicated delay value to determine whether to switch to the search space set group to be monitored.

The controller 1210 may monitor the PDCCH based on the received indication information. Based on the received indication information, the controller 1210 may attempt blind decoding in a time duration other than the time duration in which monitoring is not performed or a search space other than the search space in which monitoring is not performed. Therefore, regardless of whether the base station transmits the PDCCH, it is possible to save power by not trying to monitor for a predetermined time duration or search space.

The UE according to an embodiment may reduce power required for the low-power UE to transmit and receive the downlink control message in the NR system.

Figure 13:
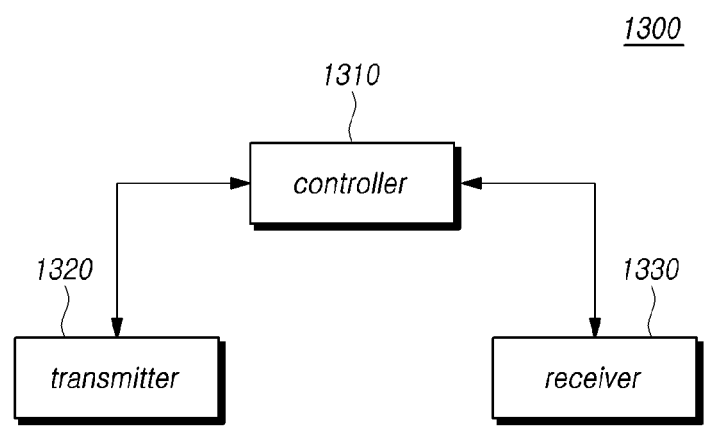
FIG. 13 is a view showing a base station according to an embodiment.

FIG. 13 is a block diagram showing a base station 1300 according to an embodiment.

Referring now to FIG. 13, the base station 1300 according to the embodiment may include a controller 1310, a transmitter 1320, and a receiver 1330.

The controller 1310 may be a set of at least one processor and control the overall operation of the base station 1300 to perform the above-described method required for the base station to control a search space according to the embodiments. The transmitter 1320 and the receiver 1330 may be circuitries that communicate with the other constituent elements and controlled by the controller 1310. The transmitter 1320 and the receiver 1330 may transmit/receive signals, messages, and data necessary to carry out the disclosed invention to and from the UE.

The transmitter 1320 may transmit configuration information for at least one search space. The transmitter 1320 may transmit the configuration information for a search space for transmitting downlink control information (DCI) to the UE. The search space includes control channel candidates that may exist in the control channel element at a specific aggregation level, and a plurality of search spaces may be configured for one UE.

According to an embodiment, the configuration information for the search space may include configuration information for a search space set group including at least one search space. In this case, the search space set group may include two search space set groups for each of at least one bandwidth part configured for the UE. Also, the group ID of the configured search space set group may be configured to 0 or 1.

The transmitter 1320 may transmit indication information for at least one of time duration information and search space information for not monitoring a downlink control channel (PDCCH) for at least one search space. The controller 1310 provides the indication information configured for the at least one search space configured in a bandwidth part activated for the UE when the UE is activated. That is, the corresponding indication information may indicate whether to monitor the search spaces configured in the currently active bandwidth part on the premise that the UE itself is in an active state.

According to an embodiment, the transmitter 1320 may transmit the indication information including the time duration information for not monitoring the downlink control channel to the UE. The time duration information may include at least one of a duration and a periodic interval for not monitoring the PDCCH. Such indication information is indicated (e.g., transmitted or delivered) through the DCI. For example, such indication information may be indicated by a predetermined field value in the DCI. In order words, the DCI may dynamically indicate a duration and periodic interval for skipping monitoring the PDCCH.

When the transmitter 1320 transmits such indication information through downlink control information, the UE may not perform monitoring for the PDCCH for the indicated duration from the time the corresponding indication information is received. Alternatively, the UE may not periodically perform monitoring for the PDCCH during the interval according to the indicated periodic interval.

As another example, the transmitter 1320 transmits the indication information including group ID information for a search space set group including a search space for not monitoring the PDCCH among the at least one search space. Such indication information is indicated through the DCI. For example, such indication information may be indicated by a predetermined field value in the DCI.

For example, the indication information may indicate switching of the search space set group to be monitored or not to be monitored according to the search space set group switching field value in DCI format 2_0. That is, as described above, it is assumed that the group ID of the two search space set groups is configured to 0 or 1 for the UE. In this case, when the value of the search space set group switching field is 0, the UE may monitor the search space set group having the group ID of 0 and stop monitoring the search space set group having the group ID of 1.

In this case, as an example, a delay value may be configured for switching of the search space set group based on the capability of the UE. The delay value required for switching of the search space set group may be configured differently according to the processing capability of the UE and the value of the subcarrier spacing applied to the corresponding bandwidth part. For example, the delay value may be configured to the number of symbols. The delay value may be configured greater as the value of subcarrier spacing becomes greater, or the delay value may be configured greater as the processing capability of the UE becomes lower. The transmitter 1320 may indicate (e.g., transmit, deliver, inform) the corresponding delay value to the UE through a higher layer signaling such as a RRC message, and the UE may further reflect the indicated delay value to determine whether to switch to the search space set group to be monitored.

Based on the received indication information, the UE may attempt blind decoding in a time duration other than the time duration in which monitoring is not performed or a search space other than the search space in which monitoring is not performed. Therefore, regardless of whether the base station transmits the PDCCH, it is possible to save power by not trying to monitor for a predetermined time duration or search space.

The base station according to an embodiment may reduce power required for the low-power UE to transmit and receive the downlink control message in the NR system.

According to the embodiments of the disclosed embodiments, it is possible to provide the method and the apparatus capable of reducing power required for the low-power UE to transmit and receive a downlink control message by controlling the search space for the low-power UE in the NR environment.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents configured forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for controlling a search space, the method comprising:
   receiving configuration information for at least one search space;
   receiving indication information on at least one of time duration information and search space information for not monitoring a downlink control channel for the at least one search space; and
   monitoring the downlink control channel based on the indication information,
   wherein the configuration information comprises configuration information for a search space set group comprising the at least one search space, and
   the indication information indicates a switching of a search space set group including a search space for not monitoring the downlink control channel among the at least one search space through downlink control information.

2. The method according to claim 1, wherein the indication information is configured for the at least one search space configured in a bandwidth part activated for the UE when the UE is in a state of activation.

3. The method according to claim 1, wherein the time duration information of the indication information comprises at least one of a duration and a periodic interval for not monitoring the downlink control channel, and the indication information is indicated through downlink control information.

4. The method according to claim 1, wherein the configuration information comprises configuration information for a search space set group comprising the at least one search space, and
   the indication information comprises group ID information for a search space set group including a search space for not monitoring the downlink control channel among the at least one search space, and is indicated through downlink control information.

5. The method according to claim 4, wherein the search space set group comprises two search space set groups for each of at least one bandwidth part configured for the UE, and the group ID included in the group ID information is configured to 0 or 1.

6. A method of a base station for controlling a search space, the method comprising:
   transmitting configuration information for at least one search space to a user equipment (UE); and
   transmitting indication information on at least one of time duration information and search space information for not monitoring a downlink control channel for the at least one search space to the UE,
   wherein the configuration information comprises configuration information for a search space set group comprising the at least one search space, and
   the indication information indicates a switching of a search space set group including a search space for not monitoring the downlink control channel among the at least one search space through downlink control information.

7. The method according to claim 6, wherein the indication information is configured for the at least one search space configured in a bandwidth part activated for the UE when the UE is in a state of activation.

8. The method according to claim 6, wherein the time duration information of the indication information comprises at least one of a duration and a periodic interval for not monitoring the downlink control channel, and the indication information is indicated through downlink control information.

9. The method according to claim 6, wherein the configuration information comprises configuration information for a search space set group comprising the at least one search space, and
   the indication information comprises group ID information for a search space set group including a search space for not monitoring the downlink control channel among the at least one search space, and is indicated through downlink control information.

10. The method according to claim 9, wherein the search space set group comprises two search space set groups for each of at least one bandwidth part configured for the UE, and the group ID included in the group ID information is configured to 0 or 1.

11. A user equipment (UE) for controlling a search space, the user equipment comprising:
    a receiver configured to receive configuration information for at least one search space, and receive indication information on at least one of time duration information and search space information for not monitoring a downlink control channel for the at least one search space; and
    a controller configured to monitor the downlink control channel based on the indication information,
    wherein the configuration information comprises configuration information for a search space set group comprising the at least one search space, and
    the indication information indicates a switching of a search space set group including a search space for not monitoring the downlink control channel among the at least one search space through downlink control information.

12. The user equipment according to claim 11, wherein the indication information is configured for the at least one search space configured in a bandwidth part activated for the UE when the UE is in a state of activation.

13. The user equipment according to claim 11, wherein the time duration information of the indication information comprises at least one of a duration and a periodic interval for not monitoring the downlink control channel, and the indication information is indicated through downlink control information.

14. The user equipment according to claim 11, wherein the configuration information comprises configuration information for a search space set group comprising the at least one search space, and
the indication information comprises group ID information for a search space set group including a search space for not monitoring the downlink control channel among the at least one search space, and is indicated through downlink control information.

15. The user equipment according to claim 14, wherein the search space set group comprises two search space set groups for each of at least one bandwidth part configured for the UE, and the group ID included in the group ID information is configured to 0 or 1.

* * * * *